(12) United States Patent
Lopez, Jr. et al.

(10) Patent No.: US 7,555,676 B2
(45) Date of Patent: Jun. 30, 2009

(54) SYSTEMS AND METHODS FOR PROVIDING REMOTELY ACCESSIBLE IN-SYSTEM EMULATION AND/OR DEBUGGING

(75) Inventors: Pedro Lopez, Jr., Austin, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 474 days.

(21) Appl. No.: 11/183,380

(22) Filed: Jul. 18, 2005

(65) Prior Publication Data

US 2007/0016827 A1 Jan. 18, 2007

(51) Int. Cl.
*G06F 11/00* (2006.01)
(52) U.S. Cl. .................................. 714/27; 714/4
(58) Field of Classification Search .................. None
See application file for complete search history.

(56) References Cited

U.S. PATENT DOCUMENTS

| | | | | |
|---|---|---|---|---|
| 5,615,331 A * | 3/1997 | Toorians et al. | ................ | 714/9 |
| 6,922,794 B2 * | 7/2005 | Tagawa et al. | ................ | 714/28 |
| 7,047,462 B2 | 5/2006 | Brown et al. | ................ | 714/724 |
| 7,096,385 B1 * | 8/2006 | Fant et al. | ................ | 714/30 |
| 7,100,086 B1 * | 8/2006 | Kudo et al. | ................ | 714/30 |
| 7,171,653 B2 | 1/2007 | Albrecht | ................ | 717/124 |
| 7,213,172 B2 | 5/2007 | Iovin et al. | ................ | 714/36 |
| 7,444,552 B2 * | 10/2008 | Kilian | ................ | 714/43 |
| 7,475,287 B2 * | 1/2009 | Shin et al. | ................ | 714/27 |
| 2003/0140291 A1 | 7/2003 | Brown et al. | ................ | 714/724 |
| 2006/0294424 A1 | 12/2006 | Boyce | ................ | 714/30 |
| 2007/0011517 A1 | 1/2007 | Boyce | ................ | 714/724 |
| 2007/0016827 A1 | 1/2007 | Lopez et al. | ................ | 714/31 |
| 2007/0168991 A1 * | 7/2007 | Greenberg et al. | ................ | 717/127 |

OTHER PUBLICATIONS

Microsoft Computer Dictionary.*

* cited by examiner

*Primary Examiner*—Christopher S McCarthy
(74) *Attorney, Agent, or Firm*—Baker Botts L.L.P.

(57) ABSTRACT

An information handling system providing remotely accessible in-system debugging functionality is provided. The information handling system may include a first logic device and a remote access card distinct from the first logic device. The remote access card may include a network interface port, a processor, and a second logic device. The network interface port may be coupled to the second logic device and configured to receive a communications link for communications with a remote device. The second logic device may include debugging logic configured to be executed by the processor. The processor may be configured to receive debugging instructions from the remote device via the network interface port and, based at least on the received debugging instructions, execute the debugging logic to communicate with the first logic device via a communication link between the first logic device and the second logic device to facilitate remote debugging of the information handling system.

20 Claims, 2 Drawing Sheets

US 7,555,676 B2

SYSTEMS AND METHODS FOR PROVIDING REMOTELY ACCESSIBLE IN-SYSTEM EMULATION AND/OR DEBUGGING

TECHNICAL FIELD

The present disclosure relates generally to information handling systems and, more particularly, to systems and methods for providing remotely accessible in-system emulation and/or debugging.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems may require debugging and/or emulation of code running on one or more CPUs of such systems. Typically, CPUs may have an In-Target Probe (ITP) port that allows BIOS, Driver, OS, and/or hardware developers to debug, step through, trace and set breakpoints in code running on the CPUs. In some situations, through the ITP, developers may obtain full access to registers in the CPUs and chipset(s) through a JTAG-like interface. Emulation/debugging boxes designed to provide this function may connect to a local client via an interface such as USB or Ethernet, and to the header or connector coupled to the CPU(s) of the system being emulated/debugged.

For example, as shown in FIG. 1, an information handling system 10 (such as a server or PC, for example) may include a CPU 12 located on a motherboard, an ITP header or connector 14 coupled to CPU 12, a remote management card (or remote access card) 16, and any other various computer components. ITP header 14 may be coupled to the motherboard along with CPU 12 and provides a connection for connecting an external emulation/debugging system 18 to CPU 12 for emulating, debugging or otherwise probing or testing information handling system 10. For example, information handling system 10 may be debugged during the development of information handling system 10 and/or during the initial start-up of information handling system 10.

Emulation/debugging system 18 may include an emulating/debugging box 20 coupled to ITP header 14 by one or more cables 22, and coupled to a local client 24 (e.g., a server or PC) via an interface such as USB or Ethernet. Emulating/debugging box 20 may include software and/or hardware suitable for communicating with CPU 12 via ITP header 14 in order to provide emulation, debugging, or other probing or testing functionality for information handling system 10. A developer or technician may operate local client 24 to control emulation/debugging box 20 to provide the desired emulation/debugging functionality.

Typically, the ITP header 14 and associated logic are depopulated once a new system goes into production, such as to save cost and/or board space on the consumer products. Thus, in order to debug a consumer-distributed information handling system 10, appropriate ITP connector(s) and circuit(s) need to be soldered or otherwise connected to the motherboard near the CPU(s) that need to be accessed by an external emulation/debugging system 18, which may be time consuming and cumbersome, particularly in dense systems in which the CPU heat sink and voltage regulators are relatively large.

SUMMARY

Therefore, a need has arisen for systems and methods for providing emulation and/or debugging functionality that reduce or eliminate problems associated with previous attempts to provide such functionality.

In accordance with one embodiment of the present disclosure, an information handling system providing remotely accessible in-system debugging functionality is provided. The information handling system may include a first logic device and a remote access card distinct from the first logic device. The remote access card may include a network interface port, a processor, and a second logic device. The network interface port may be communicatively coupled to the second logic device and configured to receive a communications link for communications with a remote device remote from the information handling system. The second logic device may include debugging logic configured to be executed by the processor. The processor may be configured to receive debugging instructions from the remote device via the network interface port and, based at least on the received debugging instructions, execute the debugging logic to communicate with the first logic device via a communication link between the first logic device and the second logic device to facilitate remote debugging of the information handling system.

In accordance with another embodiment of the present disclosure, a remote access card for facilitating remotely accessible in-system debugging of an information handling system having a first logic device distinct from the remote access card is provided. The remote access card may include a processor, a network interface port, a second logic device, and one or more connectors. The network interface port may be configured to receive a communications link for communications with a remote device. The second logic device may include debugging logic configured to be executed by the processor. The one or more connectors may be configured to provide a communication link between the second logic device and the first logic device distinct from the remote access card. The processor may be configured to remotely receive debugging instructions via the network interface port and, based at least on the received debugging instructions, execute the debugging logic on the second logic device to communicate with the first logic device via the communication link to facilitate remote debugging of the information handling system.

In accordance with yet another embodiment of the present disclosure, a method for facilitating remotely accessible in-system debugging of an information handling system is provided. The method may include receiving at a processor associated with a remote access card an interrupt notification from a first logic device distinct from the remote access card and including one or more registers. In response to receiving the interrupt notification, a second logic device of the remote access card may be automatically instructed to retrieve data from the one or more registers of the first logic device via a communications link between the second logic device and the first logic device. The data may be retrieved from the one or more registers, and made remotely accessible via a communications network.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
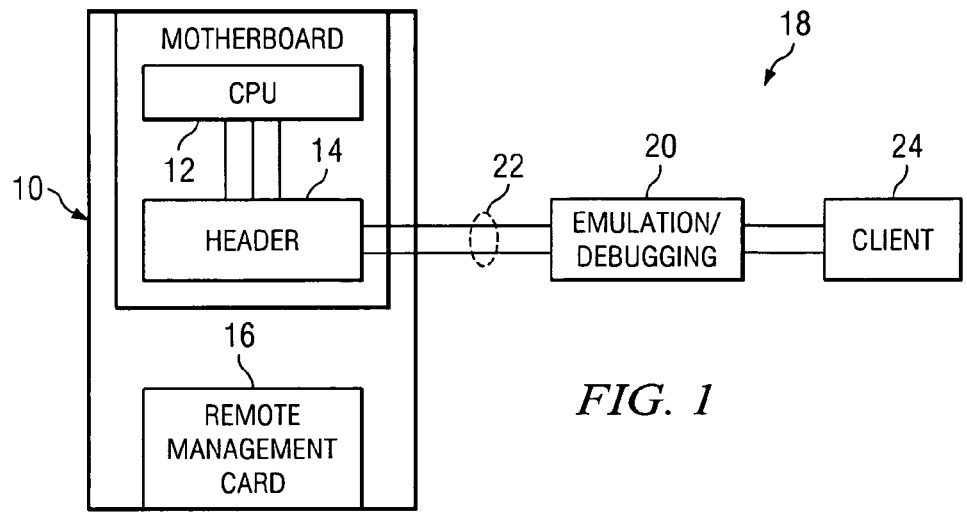
FIG. 1 illustrates an external emulation/debugging system coupled to an information handling system according to known techniques.
Figure 2:
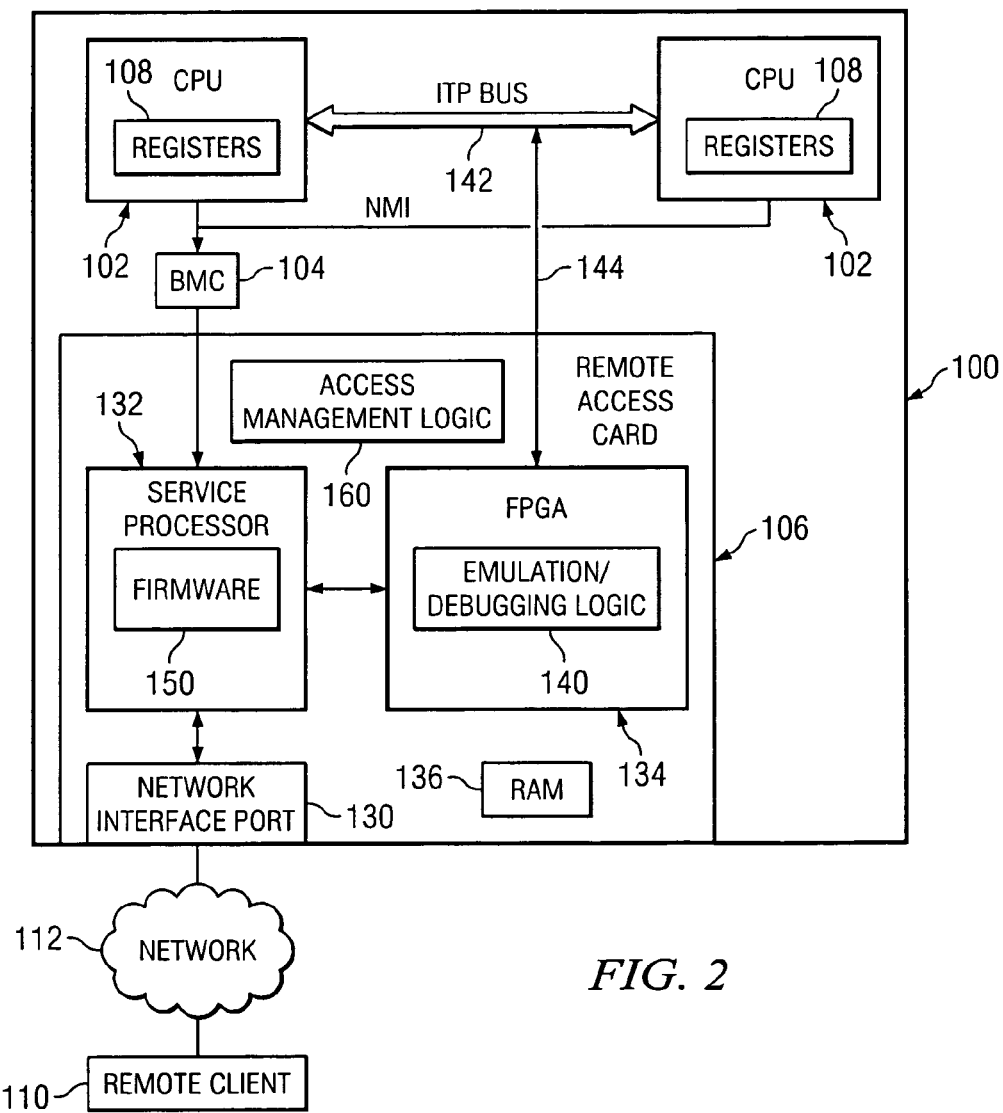
FIG. 2 illustrates an information handling system including remotely accessible in-system emulation and/or debugging functionality, according to one embodiment of the disclosure.
Figure 3:
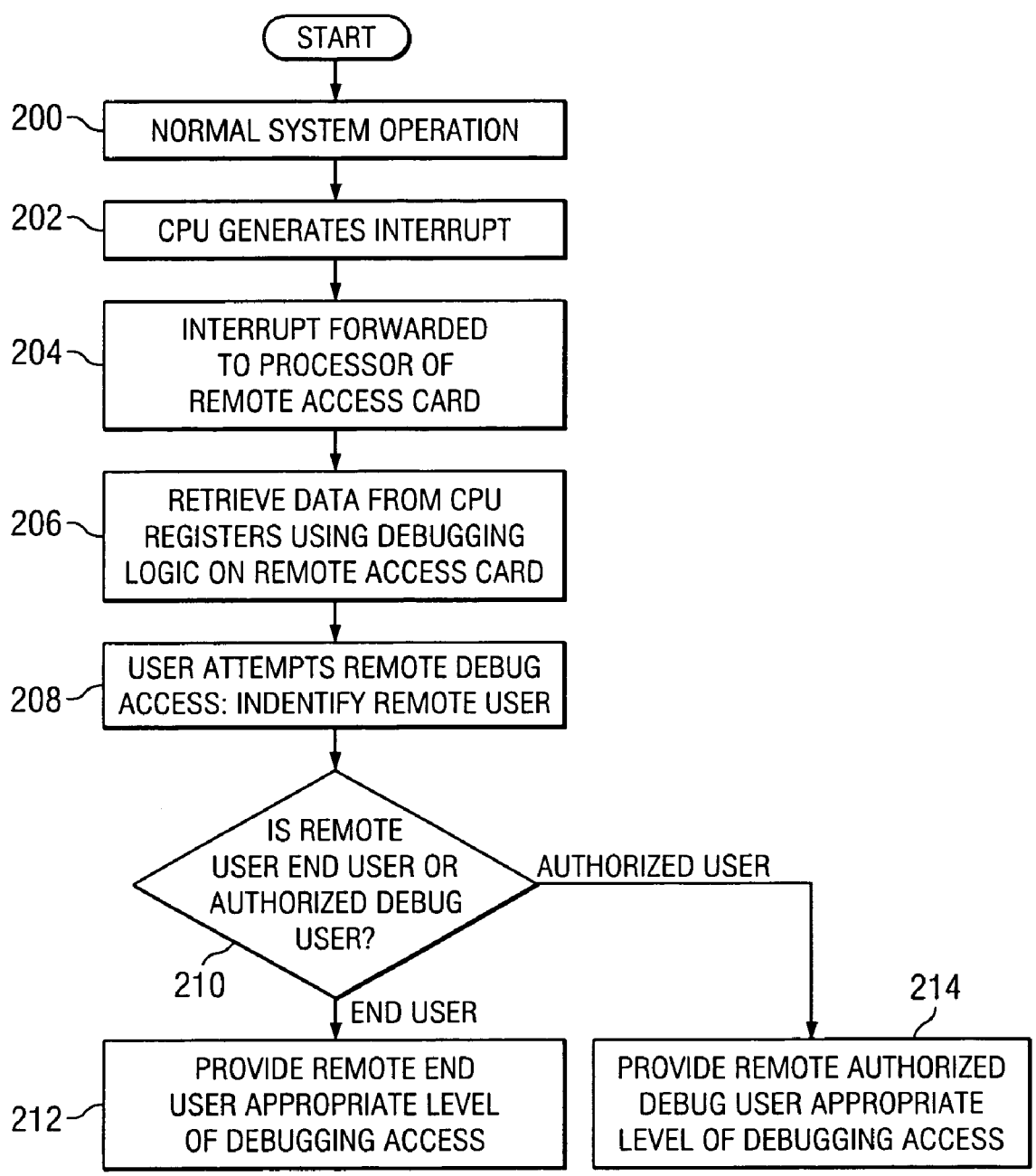
FIG. 3 illustrates a method for facilitating remotely accessible in-system debugging of an information handling system, according to one embodiment of the disclosure.

Preferred embodiments and their advantages are best understood by reference to FIGS. 2 and 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 2 illustrates an information handling system 100 including remotely accessible in-system emulation and/or debugging functionality, according to one embodiment of the disclosure. As discussed in greater detail below, system 100 may include emulation/debugging logic stored in the system 100 itself, and accessible to a remote client via a network management card such that system 100 may be debugged or otherwise probed remotely at the remote client. For example, the remote client may be able to access the emulation/debugging logic stored in system 100 in order to retrieve data from one or more CPUs of system 100 (e.g., data from various CPU bit registers) and/or instruct such one or more CPUs to execute various instructions in order to facilitate the debugging of system 100. Thus, debugging of system 100 may be performed remotely, which may provide various advantages. For example, because the emulation/debugging logic is provided in system 100 itself, there may be no need to physically attach (e.g., by soldering) an emulation/debugging system to the motherboard of system 100 in order to perform debugging of system 100. Moreover, a technician may debug or repair system 100 remotely rather than having to travel to the physical location of system 100, which may save costs and time.

As shown in FIG. 2, information handling system 100 may include one or more logic devices 102, a baseboard management controller (BMC) 104, and a remote management card, or remote access card, 106. Logic devices 102 may comprise any device(s) that include one or more registers 108, such as bit registers. In the example embodiment shown in FIG. 2, logic devices 102 comprise one or more CPUs, which may be located on a motherboard. In other embodiments, logic devices 102 may comprise any type of chip, chipset, processor, or other logic device having one or more associated registers 108. CPUs 102 may be generally operable to process various code running on system 100 in order to perform the various functions of system 100.

Remote access card 106 may be generally operable to provide one or more external devices remote access to system 100. For example, remote access card 106 may provide one or more remote clients 110 remote access to system 100 via a communication network 112. Communications network 112 may include any local area network (LAN), metropolitan area network (MAN), wide area network (WAN), wireless local area network (WLAN), virtual private network (VPN), intranet, the Internet, portions of the Internet, or any other appropriate architecture or system that facilitates the communication of data.

In the embodiment shown in FIG. 2, remote access card 106 may include a network interface port 130, a processor 132, a logic device 134, and one or more memory devices 136. In-system debugging logic 140 may be stored in, or otherwise associated with, logic device 134. In the example embodiment shown in FIG. 2, logic device 134 comprises a field programmable gate array (FPGA) in which in-system debugging logic 140 is stored. FPGA 134 may provide various system management functions, such as providing virtual KVM (vKVM) functionality, for example. In other embodiments, logic device 134 may comprise any other suitable device operable to store or provide debugging logic 140, such as a suitable memory device, for example.

In-system debugging logic 140 may include any software, code, or executable logic that may be executed to provide or facilitate emulation, debugging, probing, diagnostics, and/or probing of information handling system 100 or one or more components of system 100. For example, in-system debugging logic 140 may be operable, when executed, to retrieve data from one or more registers 108 of one or more CPUs 102 and/or instruct such one or more CPUs 102 to execute various instructions in order to facilitate the emulation, debugging, probing and/or testing of system 100. In some embodiments, in-system debugging logic 140 may be operable, when executed, to allow a user (e.g., a technician) to debug, step through, trace and/or set breakpoints in code running on the CPUs 102. In some situations, in-system debugging logic 140 may provide a user partial or full access to registers 108 in the CPUs 102.

In-system debugging logic 140 may access CPUs 102 via a communications link, or bus, 144 provided between FPGA 134 and one or more CPUs 102. Using communications link 144, in-system debugging logic 140 may communicate with one, some or all CPUs 102 of information handling system 100. In the embodiment shown in FIG. 2, communications link 144 connects FPGA 134 with a bus 142 (e.g., an ITP bus) to which CPUs 102 are linked. In contrast to existing systems in which the debugging logic is provided in an external box or pod that is physically coupled to an ITP header or connector coupled to the relevant CPU(s), in-system debugging logic 140 may be coupled to CPUs 102 without an ITP header or connector. For example, in particular embodiments, FPGA 134 may be coupled to bus 142 (or otherwise to one or more CPUs 102) via one or more pin connections between the motherboard and remote access card 106. Such pin connections may include one or more pins or similar connectors located on one or both of motherboard and remote access card 106. Thus, in some embodiments, communications link 144 may be automatically created by plugging remote access card 106 into the motherboard of system 100. In other embodiments, in-system debugging logic 140 may be otherwise coupled to one, some or all CPUs 102 of information handling system 100.

Eliminating the need for an ITP header or connector may provide various advantages, such as: (a) saving cost and/or board space, (b) eliminating the need to physically connect a header or connector to system 100 for debugging, and/or (c) reducing the weight of system 100, for example.

In addition to communications link 144, remote access card 106 may be communicatively coupled to the motherboard via any one or more interfaces, such as a sideband interface, for example. For example, remote access card 106 may be communicatively coupled to the motherboard via one or more video, USB, IPMB and/or serial interfaces, such as a media-independent interface (MII), for instance.

Emulation/debugging logic 140 may be executed by processor 132. In some embodiments, processor 132 includes firmware 150 operable to execute debugging logic 140. Processor 132 may be a service processor or any other suitable type of processor, such as a microprocessor or microcontroller, for example. Memory device(s) 136 may be coupled to processor 132 and may include one or more databases and other suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Memory device(s) 136 may or may not be integrated with logic device 134.

Network interface port 130 may include any suitable devices for connecting remote access card 106 to network 112, such as any present or future networking standards and interfaces, such as an RJ45 connector for Ethernet functionality, or suitable fiber optic connection devices, for example. In some embodiments, network interface port 130 may be configured for communicating out-of-band traffic with remote client 110 or other devices via network 112. Out-of-band traffic may include any traffic generally not related to the operational functionality of the particular information handling system 100, such as system management traffic, for example. For example, management client 110 may communicate management traffic with remote access card 106 in order to configure, update, adjust, monitor, debug, emulate, probe, test, or otherwise manage various settings or other parameters of the particular system 100. In some embodiments, the network connection between remote client 110 and system 100 may be fully or partially secure.

In some embodiments, remote access card 106 is optional and/or removable from system 100. Thus, the remote debugging functionality provided by remote access card 106 may be optional. For example, in some situations, the user may leave remote access card 106 permanently (or substantially permanently) inserted or installed in system 100. Alternatively, the user may insert remote access card 106 as desired to provide remote debugging functionality. Thus, it is contemplated that remote access card 106 may be provided as a component of a computer system provided to customers and/or as a separate component that may be purchased subsequently by users of computer systems.

In operation, system 100, including in-system debugging logic 140, may allow a remote user of remote client 110 (such as a debugger or a BIOS, hardware, or software developer, a network administrator, or a technical support technician, for example) to remotely debug, emulate, probe and/or test system 100 via network 112.

In some embodiments in which remote access card 106 may offer remote console redirection via the vKVM and the ability to remotely reset and/or power cycle system 100, a remote user may not only see and control system 100 remotely, but also achieve the same or similar level of functionality they could be achieved with a local ITP.

System 100 may provide a remote user access to view and/or retrieve data from one or more registers 108 of one or more CPUs 102. For example, the remote user may remotely execute debugging logic 140 to obtain a partial or complete system dump of some or all registers 108 at a particular instant in time, which data may be used, e.g., to diagnose a problem or for other debugging or testing functions. In addition, the remote user may remotely execute debugging logic 140 to instruct CPUs 102 to execute various instructions in order to facilitate the emulation, debugging, probing and/or testing of system 100. For example, in-system debugging logic 140 may be may allow a remote user to debug, step through, trace and/or set breakpoints in code running on the CPUs 102.

In some embodiments, system 100 may by operable to automatically record data relevant to a system error or problem and make such data available to remote client 110. For example, system 100 may include software, firmware, and/or hardware configured such that when baseboard management controller 104 detects that a non-maskable interrupt (NMI) has occurred on a CPU, baseboard management controller 104 automatically communicates the NMI to remote access card 106, such as via an Intelligent Platform Management Interface (IPMI) command, for example. Firmware 150 may then initiate, using debugging logic 140, a set of commands to CPUs 102 and/or relevant chipset ITP ports to retrieve and log a full (or partial) register dump of the system's status. A remote user may then retrieve the comprehensive (or partial) failure data remotely and without need to physically open system 100. In some embodiments, such functions occur in firmware and do not rely on unique drivers or applications loaded to the operating system of system 100.

The ability to retrieve such failure data and have remote ITP access to system 100 (e.g., a customer PC or server) while system 100 is in the failed state may be a powerful debugging tool for remote users, such as debuggers and/or BIOS, driver, OS, and hardware developers, for example. In particular, such remote users may characterize and/or debug many problems without any local intervention.

In addition, in some embodiments, system 100 may be configured to control the access of various users to the in-system debugging functions of system 100. For example, system 100 may include access management logic 160 operable to define multiple levels of access for various users of system 100 to the debugging functions provided by remote access card 106. Access management logic 160 may be embodied in any suitable software and/or firmware, and may be stored by or associated with any suitable component of system 100. For example, access management logic 160 may be stored by or associated with processor 132 or FPGA 134.

Access management logic 160 may define levels of access for various users based on one or more parameters of such users. For example, access management logic 160 may define (a) an authorized debug user access level providing authorized debug users (such as particular developers and/or debuggers, for example) full access to debugging logic 140 and/or registers 108 of CPUs 102, and (b) an end user access level providing end users only partial, or restricted, access to debugging logic 140 and/or registers 108 of CPUs 102. An "end user" may include, for example, the purchaser or owner of system 100 and/or a person that uses system 100 at work or in another capacity. Such access may be managed by a user authentication system, which may, e.g., require users to enter various identity information (e.g., user names and passwords) to obtain access to the in-system debugging functions of system 100.

For example, the end user access level may permit the end user to only read data that has been retrieved by FPGA 134, such as system data that has been dumped from registers 108, for example. The end user access level may restrict the end user from various data or functions, such as modifying data in registers 108, directly accessing registers 108, and/or controlling processor 132 and/or FPGA 134 to instruct CPUs 102 to execute various debug commands. Such restricted access may reduce the likelihood of the end user damaging system 100, for example. In contrast, the authorized debug user access level may only allow authorized debug users to read data that has been retrieved by FPGA 134, directly access registers 108, controlling processor 132 and/or FPGA 134 to instruct CPUs 102 to retrieve various data and/or execute various debug commands, and/or to otherwise control the emulation, debugging, testing, and/or probing of system 100. It should be understood that although two example user access levels are discussed above, access management logic 160 may define any number and types of access levels providing various types of access to the in-system debugging functionality provided by system 100.

FIG. 3 illustrates a method for facilitating remotely accessible in-system debugging of an information handling system 100, according to one embodiment of the disclosure. At step 200, system 100 may perform various typical operations, such as executing various software applications, for example. At step 202, one or more CPUs 102 may generate an interrupt notification, such an a non-maskable interrupt, for example. Such interrupt may be generated in response to a system error, crash, or hang, for example.

At step 204, the CPU(s) 102 may forward the interrupt to baseboard management controller (BMC) 104, which may forward the interrupt to processor 132 of remote access card 106. At step 206, in response to receiving the interrupt notification, firmware 150 may automatically instruct debugging logic 140 on FPGA 134 to retrieve data from one or more registers 108 of CPU(s) 102. For example, debugging logic 140 may instruct CPU(s) 102 to initiate a partial or complete system dump of some or all registers 108 of CPU(s) 102, which data may be used, e.g., to diagnose the cause of the interrupt and/or for other debugging or testing functions.

At some point after the system interrupt, a user may remotely access (or attempt to remotely access) particular functions provided by system 100 for remote diagnosis and/or debugging of the system. For example, a user of remote client 110 may attempt to access system 100 via network 112 and remote access card 106 in order to diagnose and/or debug system 100. At step 208 system 100 may identify the remote user, which may include receiving user login information via network 112 and via remote access card 106, and comparing such user login information with a local or remote database of user information. At step 210, system 100 may determine the appropriate access level corresponding with the remote user identified at step 208. For example, it is assumed for the current example that system 100 maintains at least two access levels, including an end user access level and an authorized debug user access level. If the user is identified as an end user, at step 212, system 100 may provide the end user restricted access to various debug information and/or functions, as defined by access management logic 160 for end user access.

For example, system 100 may allow the end user to view data dumped from registers 108, but not to directly access registers 108 or control CPUs 102.

Alternatively, if the user is identified as an authorized debug user, at step 214, system 100 may provide the authorized debug user remote access, via network 112 and remote access card 106, to various debug information and/or functions, as defined by access management logic 160 for authorized debug user access. For example, system 100 may allow the authorized debug user to remotely—via network 112 and remote access card 106—view data dumped from registers 108, directly access registers 108, control processor 132 and/or FPGA 134 to instruct CPUs 102 to retrieve various data and/or execute various debug commands, and/or to otherwise control the emulation, debugging, testing, and/or probing of system 100. In this manner, the authorized debug user may perform various diagnostic and/or debugging functions for system 100 remotely, without needing to visit the physical location of system 100.

Although the disclosed embodiments have been described in detail, it should be understood that various changes, substitutions and alterations can be made to the embodiments without departing from their spirit and scope.

What is claimed is:

1. An information handling system providing remotely accessible in-system debugging functionality, comprising:
    a first logic device;
    a remote access card distinct from the first logic device, the remote access card including a network interface port, a processor, and a second logic device;
    the network interface port communicatively coupled to the second logic device and configured for allowing communications with a remote device remote from the information handling system and including a user interface;
    the second logic device including debugging logic configured to be executed by the processor;
    a communication link allowing communication between the first logic device and the second logic device; and
    the processor on the remote access card configured to:
        receive an interrupt notification from the first logic device distinct from the remote access card, wherein the interrupt notification from the first logic device is generated in response to a system error, system crash, or system hang, the interrupt notification triggering an automatically retrieval of data from the first logic device via the communication link between the first logic device and the second logic device;
        receive, via the network interface port, debugging instructions initiated by a user via the user interface of the remote device; and
        based at least on the received debugging instructions, execute the debugging logic provided on the remote access card to facilitate remote debugging of the information handling system without local manual interaction, including allowing a user to view the data automatically retrieved from the first logic device in response to the interrupt notification.

2. The information handling system of claim 1, wherein:
    the first logic device includes one or more registers; and
    facilitating remote debugging of the information handling system comprises retrieving data from the one or more registers based on the debugging instructions received from the remote device.

3. The information handling system of claim 1, wherein facilitating remote debugging of the information handling system comprises executing instructions on the first logic device based on the debugging instructions received from the remote device.

4. The information handling system of claim 1, wherein the processor is configured to receive debugging instructions from the remote device via the network interface port and, based at least on the received debugging instructions, execute the debugging logic to facilitate emulation of the first logic device.

5. The information handling system of claim 1, wherein:
the first logic device comprises a chip or chipset; and
the second logic device comprises a field programmable gate array (FPGA).

6. The information handling system of claim 1, wherein the processor includes firmware configured to execute the debugging logic associated with the second logic device.

7. The information handling system of claim 6, wherein:
the first logic device includes one or more registers; and
the firmware is configured to:
receive the interrupt notification from the first logic device; and
in response to receiving the interrupt notification, instruct the second logic device to retrieve data from the one or more registers.

8. The information handling system of claim 7, wherein the firmware is configured to, in response to receiving the interrupt notification, instruct the second logic device to retrieve a register dump defining the status of the information handling system.

9. The information handling system of claim 1, wherein:
the first logic device is located on a motherboard;
the remote access card is plugged into the motherboard by a plurality of pin connections; and
the communication link allowing communication between the first logic device and the second logic device is routed through a subset of one or more of the plurality of pin connections.

10. The information handling system of claim 1, further comprising access management logic operable to define multiple levels of access for various users of the information handling system for utilizing the debugging logic.

11. A remote access card for facilitating remotely accessible in-system debugging of an information handling system having a first logic device distinct from the remote access card, the remote access card comprising:
a processor configured to receive an interrupt notification from the first logic device distinct from the remote access card, wherein the interrupt notification from the first logic device is generated in response to a system error, system crash, or system hang;
a network interface port configured to receive a communications link for communications with a remote device;
a second logic device including debugging logic configured to be executed by the processor;
the second logic device configured to, in response to the interrupt notification, automatically retrieve data from the first logic device via a communication link between the second logic device and the first logic device distinct from the remote access card; and
the processor provided on the remote access card configured to receive debugging instructions from the remote device via the network interface port and, based at least on the received debugging instructions, execute the debugging logic on the second logic device to facilitate remote debugging of the information handling system without local manual interaction, including allowing a user to view the data automatically retrieved from the first logic device in response to the interrupt notification.

12. The remote access card of claim 11, wherein:
the first logic device includes one or more registers; and
facilitating remote debugging of the information handling system comprises retrieving data from the one or more registers based on the remotely received debugging instructions.

13. The remote access card of claim 11, wherein facilitating remote debugging of the information handling system comprises executing instructions on the first logic device based on the remotely received debugging instructions.

14. The remote access card of claim 11, wherein:
the first logic device comprises a chip or chipset; and
the second logic device comprises a field programmable gate array (FPGA).

15. The remote access card of claim 11, wherein the processor includes firmware configured to execute the debugging logic on the second logic device.

16. The remote access card of claim 15, wherein:
the first logic device includes one or more registers; and
the firmware is configured to:
receive the interrupt notification from the first logic device; and
in response to receiving the interrupt notification, instruct the second logic device to retrieve data from the one or more registers.

17. The remote access card of claim 16, wherein the firmware is configured to, in response to receiving the interrupt notification, instruct the second logic device to retrieve a register dump defining the status of the information handling system.

18. The remote access card of claim 11, wherein:
the first logic device is located on a motherboard;
the one or more connectors for providing a communication link between the second logic device and the first logic device comprise one or more pin connectors.

19. The remote access card of claim 11, further comprising access management logic operable to define multiple levels of access for various users for utilizing the debugging logic.

20. A method for facilitating remotely accessible in-system debugging of an information handling system, comprising:
receiving at a first processor located on a remote access card an interrupt notification from a second processor distinct from the remote access card and including one or more registers, wherein the interrupt notification from the second processor is generated in response to a system error, system crash, or system hang;
in response to receiving the interrupt notification, automatically instructing a logic device of the remote access card to retrieve data from the one or more registers of the second processor via a communications link between the logic device of the remote access card and the second processor;
receiving the data from the one or more registers of the first processor; and
providing remote access to the data via a communications network for remote debugging of the information handling system without local manual interaction.

* * * * *